United States Patent
Biswas et al.

(10) Patent No.: US 10,657,246 B2
(45) Date of Patent: May 19, 2020

(54) AUTHENTICATED DISCOVERABILITY OF UNIVERSAL WINDOWS APPLICATIONS TO WIN32 DESKTOP APPLICATIONS

(71) Applicant: McAfee, LLC, Santa Clara, CA (US)

(72) Inventors: Shuborno Biswas, Waterloo (CA); Keefer T. Davies, Waterloo (CA); Junmin Qiu, Waterloo (CA); Christopher M. Roy, Waterloo (CA)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/938,984

(22) Filed: Mar. 28, 2018

(65) Prior Publication Data

US 2018/0285554 A1 Oct. 4, 2018

Related U.S. Application Data

(60) Provisional application No. 62/478,244, filed on Mar. 29, 2017.

(51) Int. Cl.

| | |
|---|---|
| *G06F 21/44* | (2013.01) |
| *G06F 9/445* | (2018.01) |
| *G06F 21/64* | (2013.01) |
| *G06F 9/448* | (2018.01) |
| *G06F 9/54* | (2006.01) |
| *G06F 21/60* | (2013.01) |
| *G06F 21/62* | (2013.01) |

(52) U.S. Cl.
CPC .............. *G06F 21/44* (2013.01); *G06F 9/448* (2018.02); *G06F 9/44505* (2013.01); *G06F 9/542* (2013.01); *G06F 21/606* (2013.01); *G06F 21/6236* (2013.01); *G06F 21/6281* (2013.01); *G06F 21/64* (2013.01)

(58) Field of Classification Search
None
See application file for complete search history.

(56) References Cited

U.S. PATENT DOCUMENTS

2012/0147012 A1 * 6/2012 Lau
2016/0080334 A1 * 3/2016 Hamilton
(Continued)

OTHER PUBLICATIONS

Estabrook et al., "Desktop Bridge," Microsoft Docs, UWP app developer, Aug. 30, 2017, retrieved on Jun. 25, 2018, 10 pages.
(Continued)

*Primary Examiner* — Syed A Roni
(74) *Attorney, Agent, or Firm* — Hanley, Flight & Zimmerman, LLC (57) ABSTRACT

An example method includes executing a first executable application designed for execution using a first application programming interface (API). A first registration request is accessed from a second executable application designed for execution using a second API different from the first API, the first API and the second API executed within a same operating system environment. In response to validating of a digital certification of the second application, information from the first registration request is saved into a registration store. An event is raised having an event type and event information, and in response to determining that an event type of the raised event is saved in the registration store, the raised event is sent without requiring further authentication from the second executable application.

18 Claims, 8 Drawing Sheets

(56) References Cited

U.S. PATENT DOCUMENTS

2017/0104799 A1* 4/2017 Prock
2018/0150288 A1* 5/2018 Shantharam

OTHER PUBLICATIONS

Microsoft, "Desktop Bridge, Benefits of the Desktop Bridge," Desktop conversion for UWP apps—Windows app development, retrieved on Jun. 25, 2018, 3 pages.

* cited by examiner

AUTHENTICATED DISCOVERABILITY OF UNIVERSAL WINDOWS APPLICATIONS TO WIN32 DESKTOP APPLICATIONS

TECHNICAL FIELD

Embodiments described herein relate generally to the authenticated discoverability of applications and, particularly, to a system for performing authenticated discovery of Universal Windows Applications to Win32 desktop applications.

BACKGROUND

The Universal Windows Platform (UWP) is a platform-homogeneous application architecture created by MICROSOFT® and first introduced in WINDOWS® 10. The purpose of the UWP software platform is to help develop universal applications that run on both WINDOWS 10® and WINDOWS® 10 Mobile operating systems, without the need to be re-written for each operating system. (MICROSOFT and WINDOWS are registered trademarks of Microsoft Corp.) At the current time, Universal Windows Applications' ("UWP App") App Services, which are the standard mechanism of interprocess communication (IPC) in UWP, are not programmatically discoverable in Windows.

More particularly, there are no known solutions that address UWP discoverability in a secure and/or company-specific fashion. In other words, a UWP or a Win32 Desktop Application ("Win32 App") does not have a native Windows API to ask: "Give me all of the App Services I can access from Company X." UWP Apps would typically be designed to communicate with other UWP Apps that are not from the same vendor. The UWP App author would have to have pre-arranged the App Service identifier for a third party UWP App and embedded it into their UWP App for it to have been discovered.

Further, UWP App Services have no current Windows-native registration/discoverability paradigm. Typically, for UWP-to-UWP communication (for which App Services are typically used), it would be the attempted connection to a well-known App Service that would be the first point of discoverability. The calling App thus must know all callable Apps (and its Services' identities) from within its own App, which is more burdensome and cumbersome than identifying an App Service by its run-time availability.

What is needed is a system that allows UWP Apps (or other applications designed to run on a hybrid, i.e., cross-platform, operating system or universal development platform) to securely identify themselves, e.g., by their cross-platform App Services, to a Win32 App (or other applications designed to have a mechanism to establish trust with applications on different platforms). Once trust is established, the UWP Apps may opt-in for communication of certain Events from the Win32 App. In such a system, the Win32 App can be certain it is opening App Service connections only to UWP Apps that are trusted and that are interested in receiving a particular type of communication. Such a system may be particularly valuable for use with anti-virus/malware (AV) protection software applications because, currently, Win32 Apps serve as the primary source of AV applications, and, as such, are the primary Event source for AV-related Events.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "a computer system" can refer to a single computer or a plurality of computers working together to perform the function described as being performed on or by a computer system.

As used herein, the term "processor" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processor to perform an action may program any or all of the processors to perform the indicated action.

Where the processor is one or more multi-core processors, instructions that when executed program the processor to perform an action may program any or all of the multiple cores to perform the indicated action.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

The term "or" means any of the alternatives and any combination of the alternatives, including all of the alternatives, unless the alternatives are explicitly indicated as mutually exclusive.

In the absence of a single reference point for evaluating multi-device security risk levels, it may be difficult for users to get a high-level picture of their security and privacy (e.g., risks, implications, status, etc.) across all of their devices. The user's connected devices could comprise, e.g., smartphones, health trackers, smart watches, home automation devices, home security devices, online financial transactions, social network interactions, cars, etc.

According to some embodiments disclosed herein, UWP Apps can declare their availability programmatically, and Win32 Apps can authenticate their eligibility for communication by inspecting their Digital Certificates and validating their digital signatures, e.g., during the UWP App's self-registration stage. UWP Apps enabled with "Desktop Bridge" (a Universal Windows feature provided to serve as a bridging application to bring users' Win32 code into the world of the UWP) may package and run a Win32 "Full Trust EXE." The Full Trust EXE (i.e., Full Trust executable file) is able to communicate using Native Windows Desktop (i.e., Win32) APIs to a standard Windows NT Service used by a Win32 App.

According to further embodiments disclosed herein, the Full Trust EXE may communicate its App Service entry point (as indicated in the UWP App's manifest file) and supported protocols (i.e., a proprietary contract between the Win32 App caller and the UWP callee) to the Win32 App's NT Service. The NT Service may then authenticate the Full Trust EXE using a Digital Certificate, and persist the UWP App's entry point and protocols, e.g., in a secure registration store. In this way, the UWP App has identified its App Service as a trusted entry point for the Win32 App to use.

In summary, the systems described herein provide generalized and decoupled solutions that eliminate any pre-arranged dependencies between the UWP App's author and the Win32 Desktop Application author, for instances when the Win32 App needs to have a coded awareness of the supported UWP App's App Services. The aforementioned Digital Certificate may be used as the authentication mechanism, and any UWP App signed appropriately may make itself discovered by the Win32 App in this fashion.

Figure 1:
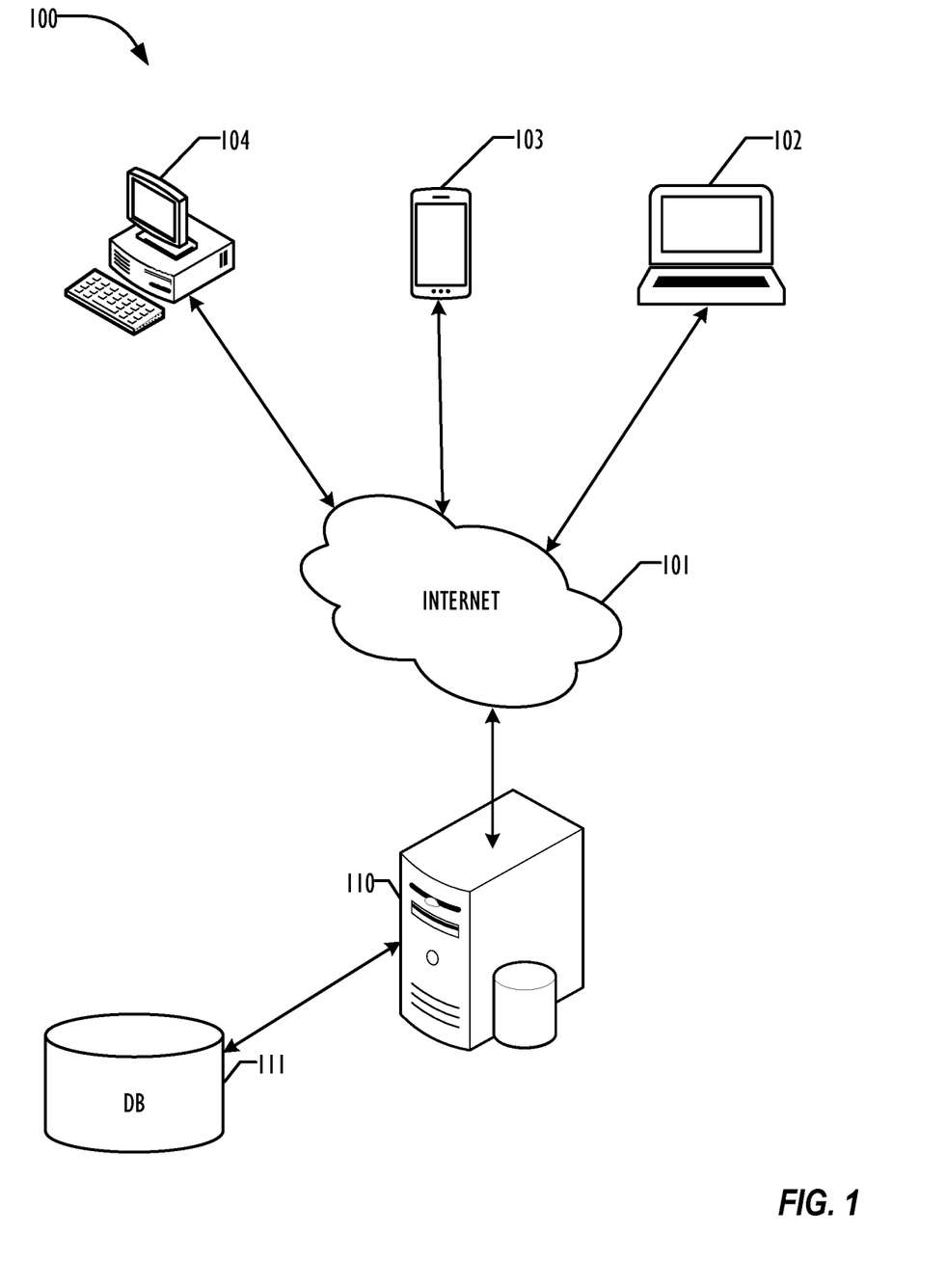
FIG. 1 is a pictorial diagram of an exemplary multi-device ecosystem, according to one or more embodiments disclosed herein.

FIG. 1 is a pictorial diagram of an exemplary multi-device ecosystem 100, according to one or more embodiments disclosed herein. The database 111 represents any data store (e.g., local or remote to the client devices) that may be accessed by one or more users using one or more client devices 102-104, e.g., via communicating with web server 110 over Internet 101. Database 111 may, e.g., store information related to a particular third party that is attempting to offer software applications, such as UWP Apps, to the client devices. In some embodiments, the client computer 104, for example, may use standard Win32 mechanisms, such as Digital Certificate validation, to establish trust in the source, e.g., the software provider, of a given UWP App over Internet 101. As will be described in further detail below, the process of establishing trust in the source of a UWP App 'up front' may allow the client devices 102-104 to later perform secure message transfers in a more efficient manner. For example, if the validity of the source of a UWP App is already authenticated by a particular Win32 App at the point the UWP App is registered, then no further validation—which is a relatively computationally intensive task—needs to be performed by the Win32 App, e.g., when attempting to pass Events or other information to "interested" UWP Apps. As used herein, "interested" UWP Apps may be used to refer to UWP Apps that have previously registered to listen to particular types of Events raised by the particular Win32 App. In other embodiments, the Digital Certificate validation process could occur locally on a client device, i.e., no network connectivity would be required for the validation process to take place.

Figure 2:
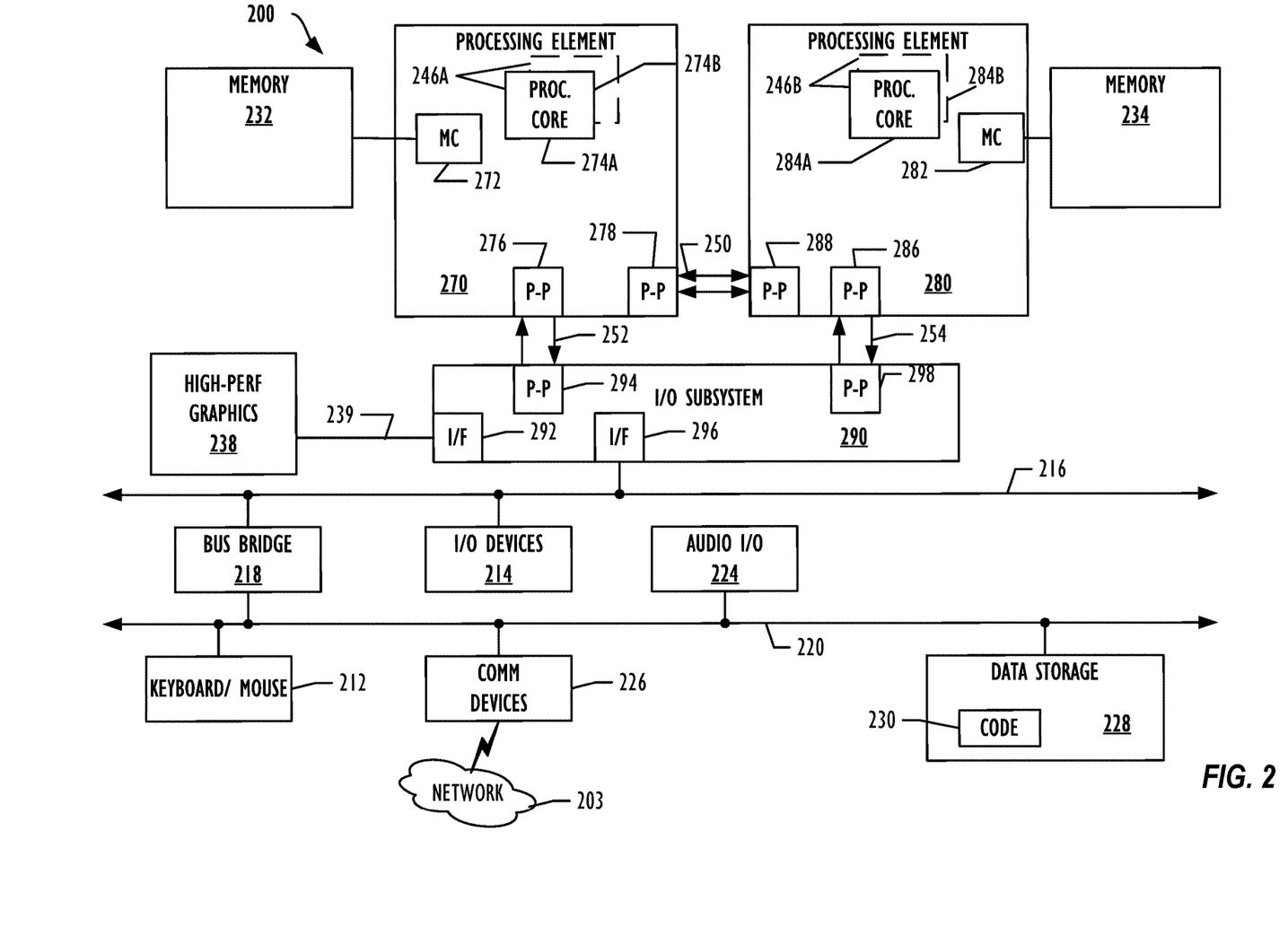
FIGS. 2-3 are block diagrams illustrating a computing device for use with techniques according to two or more embodiments disclosed herein.

Referring now to FIG. 2, a block diagram illustrates a programmable device 200 that may be used for implementing the techniques described herein, in accordance with one embodiment. The programmable device 200 illustrated in FIG. 2 is a multiprocessor programmable device that includes a first processing element 270 and a second processing element 280. While two processing elements 270 and 280 are shown, an embodiment of programmable device 200 may also include only one such processing element.

Programmable device 200 is illustrated as a point-to-point interconnect system, in which the first processing element 270 and second processing element 280 are coupled via a point-to-point interconnect 250. Any or all of the interconnects illustrated in FIG. 2 may be implemented as a multi-drop bus rather than point-to-point interconnects.

As illustrated in FIG. 2, each of processing elements 270 and 280 may be multicore processors, including first and second processor cores (i.e., processor cores 274a and 274b and processor cores 284a and 284b). Such cores 274a, 274b, 284a, 284b may be configured to execute instruction code. However, other embodiments may use processing elements that are single core processors as desired. In embodiments with multiple processing elements 270, 280, each processing element may be implemented with different numbers of cores as desired.

Each processing element 270, 280 may include at least one shared cache 246. The shared cache 246a, 246b may store data (e.g., instructions) that are utilized by one or more components of the processing element, such as the cores 274a, 274b and 284a, 284b, respectively. For example, the shared cache may locally cache data stored in a memory 232, 234 for faster access by components of the processing elements 270, 280. In one or more embodiments, the shared cache 246a, 246b may include one or more mid-level caches, such as level 2 (L2), level 3 (L3), level 4 (L4), or other levels of cache, a last level cache (LLC), or combinations thereof.

While FIG. 2 illustrates a programmable device with two processing elements 270, 280 for clarity of the drawing, the scope of the present invention is not so limited, and any number of processing elements may be present. Alternatively, one or more of processing elements 270, 280 may be an element other than a processor, such as an graphics processing unit (GPU), a digital signal processing (DSP) unit, a field programmable gate array, or any other programmable processing element. Processing element 280 may be heterogeneous or asymmetric to processing element 270.

There may be a variety of differences between processing elements 270, 280 in terms of a spectrum of metrics of merit including architectural, microarchitectural, thermal, power consumption characteristics, and the like. These differences may effectively manifest themselves as asymmetry and heterogeneity amongst processing elements 270, 280. In some embodiments, the various processing elements 270, 280 may reside in the same die package.

First processing element 270 may further include memory controller logic (MC) 272 and point-to-point (P-P) interconnects 276 and 278. Similarly, second processing element 280 may include a MC 282 and P-P interconnects 286 and 288. As illustrated in FIG. 2, MCs 272 and 282 couple processing elements 270, 280 to respective memories, namely a memory 232 and a memory 234, which may be portions of main memory locally attached to the respective processors. While MC logic 272 and 282 is illustrated as integrated into processing elements 270, 280, in some embodiments, the memory controller logic may be discrete logic outside processing elements 270, 280 rather than integrated therein.

Processing element 270 and processing element 280 may be coupled to an I/O subsystem 290 via respective P-P interconnects 276 and 286 through links 252 and 254. As illustrated in FIG. 2, I/O subsystem 290 includes P-P interconnects 294 and 298. Furthermore, I/O subsystem 290 includes an interface 292 to couple I/O subsystem 290 with a high performance graphics engine 238. In one embodiment, a bus (not shown) may be used to couple graphics engine 238 to I/O subsystem 290. Alternately, a point-to-point interconnect 239 may couple these components.

In turn, I/O subsystem 290 may be coupled to a first link 216 via an interface 296. In one embodiment, first link 216 may be a Peripheral Component Interconnect (PCI) bus, or a bus such as a PCI Express bus or another I/O interconnect bus, although the scope of the present invention is not so limited.

As illustrated in FIG. 2, various I/O devices 214, 224 may be coupled to first link 216, along with a bridge 218 that may couple first link 216 to a second link 220. In one embodiment, second link 220 may be a low pin count (LPC) bus. Various devices may be coupled to second link 220 including, for example, a keyboard/mouse 212, communication device(s) 226 (which may in turn be in communication with the computer network 203), and a data storage unit 228 such as a disk drive or other mass storage device which may include code 230, in one embodiment. The code 230 may include instructions for performing embodiments of one or more of the techniques described above. Further, an audio I/O 224 may be coupled to second link 220.

Note that other embodiments are also contemplated. For example, instead of the point-to-point architecture of FIG. 2, a system may implement a multi-drop bus or another such communication topology. Although links 216 and 220 are illustrated as busses in FIG. 2, any desired type of link may be used. In addition, the elements of FIG. 2 may alternatively be partitioned using more or fewer integrated chips than illustrated in FIG. 2.

Figure 3:
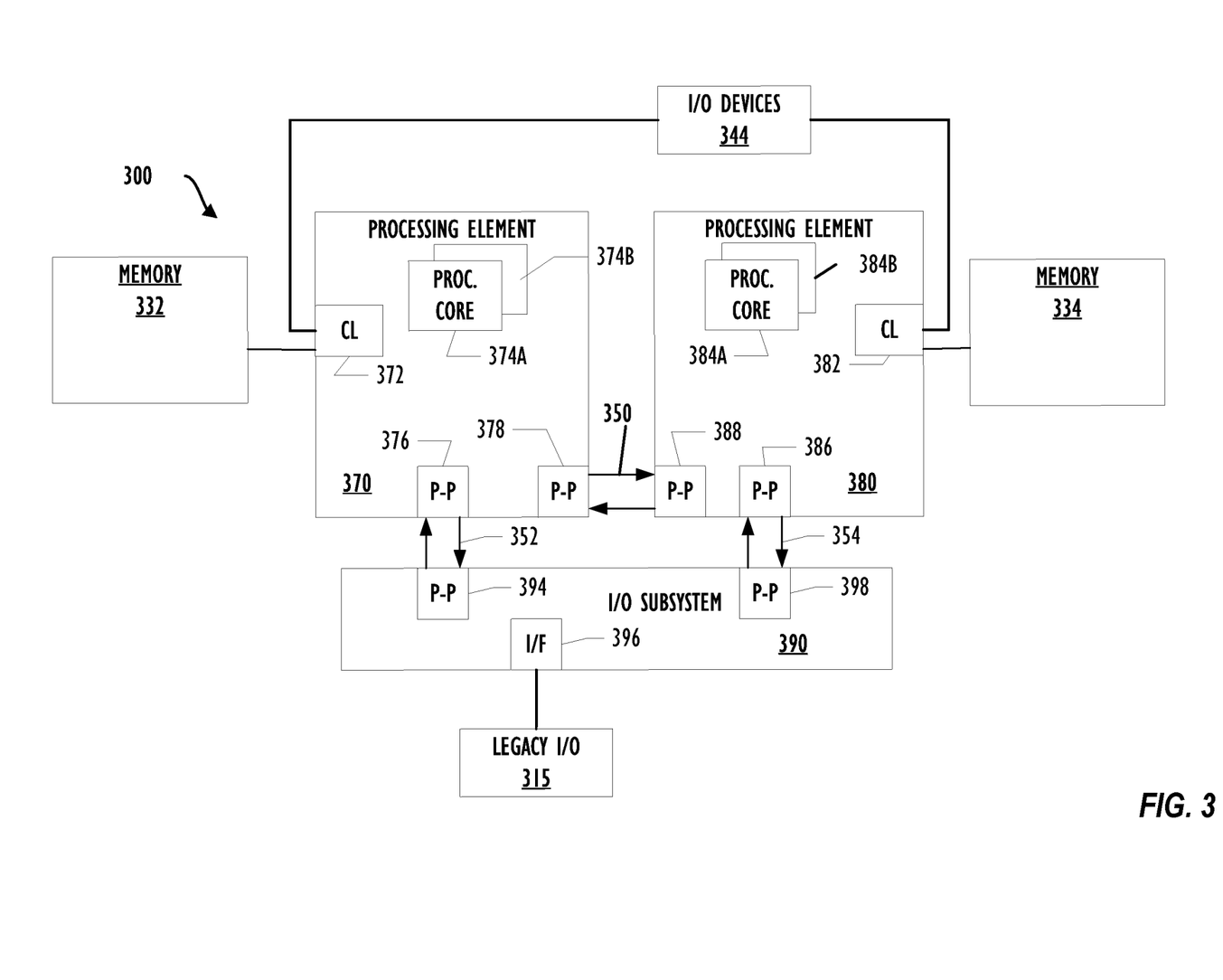

Referring now to FIG. 3, a block diagram illustrates a programmable device 300 according to another embodiment. Certain aspects of FIG. 3 have been omitted from FIG. 3 in order to avoid obscuring other aspects of FIG. 3.

FIG. 3 illustrates that processing elements 370, 380 may include integrated memory and I/O control logic ("CL") 372 and 382, respectively. In some embodiments, the 372, 382 may include memory control logic (MC) such as that described above in connection with FIG. 2. In addition, CL 372, 382 may also include I/O control logic. FIG. 3 illustrates that not only may the memories 332, 334 be coupled to the CL 372, 382, but also that I/O devices 344 may also be coupled to the control logic 372, 382. Legacy I/O devices 315 may be coupled to the I/O subsystem 390 by interface 396. Each processing element 370, 380 may include multiple processor cores, illustrated in FIG. 3 as processor cores 374A, 374B, 384A and 384B. As illustrated in FIG. 3, I/O subsystem 390 includes point-to-point (P-P) interconnects 394 and 398 that connect to P-P interconnects 376 and 386 of the processing elements 370 and 380 with links 352 and 354. Processing elements 370 and 380 may also be interconnected by link 350 and interconnects 378 and 388, respectively.

The programmable devices depicted in FIGS. 2 and 3 are schematic illustrations of embodiments of programmable devices that may be utilized to implement various embodiments discussed herein. Various components of the programmable devices depicted in FIGS. 2 and 3 may be combined in a system-on-a-chip (SoC) architecture.

A Generalized Architecture for a UWP Authenticated Discoverability Ecosystem

As mentioned above, the embodiments disclosed herein provide generalized and decoupled solutions that eliminate any need for pre-arranged dependencies between the UWP App's author and the Win32 Desktop Application author, for instances when the Win32 App needs to have a coded awareness of the supported UWP App's App Services.

UWP App Services were designed to allow the Windows platform to "host" UWP Apps as a service, e.g., like a web service hosted by the UWP App on the Windows Endpoint. Any calling App may thus connect to the UWP App Service, asking the UWP App to perform a function, and potentially return the result. In this paradigm, the UWP App Service serves as the platform.

The solutions presented herein actually invert this pattern, allowing the Win32 App to serve as the platform, in order to better facilitate the distribution of information regarding Events arising from a Win32 App or stack of applications. For example, in a typical installation, the Win32 App is always functioning and producing Events, i.e., it functions as a Platform that serves out Events to any trusted UWP App that wants to listen. Usually, only Windows-native features can work in this way (e.g., Cortana invoking a UWP App Service to pass in voice commands to a UWP App). The solutions presented herein actually allow third party Win32 Processes to securely discover and invoke registered UWP Apps in a similar way. According to these solutions, the UWP App does not always have to be running; instead, the Win32 App may discover and invoke the relevant UWP App(s) when a relevant Event is available.

Currently, Win32 Services and Processes can opt-in to Event broadcasts from another Win32 Process or Service, e.g., leveraging various mechanisms, such as Digital Certificates, to establish trust, and interprocess communication mechanisms, such as Named Pipes, to transmit data securely. However, there is no native capability in Windows for a trusted UWP App to opt-in to Event broadcasts from a Win32 Process or Service in the same way. According to the embodiments described herein, systems and methods are presented to allow for any UWP App to establish trust with a Win32 "caller" App and, if so desired, to opt-in to receive Events from the Win32 caller App. According to some such embodiments, this is achieved by leveraging native Windows UWP App Services and Desktop Bridge capabilities in a novel way.

The solutions presented herein are also said to be "decoupled" because the Win32 App does not need to know which UWP Apps could be present on the system through its own configuration (e.g., via a searchable "whitelist"). The Win32 App also does not need to have a pre-determined list of Events to send to these UWP Apps. Instead, according to the solutions presented herein, the Win32 App provides the capability of registration for Events, and any properly authenticated UWP App can register itself with a given Win32 App. This decouples the UWP Apps from the Win32 App, such that the UWP Apps can be independently developed and deployed, and only need to know the relevant Event names and have access to an appropriate Registration API. In other words, the Win32 App doesn't have to know anything about the UWP Apps for the registration process to work.

For example, assuming one vendor's UWP App requires information from a Win32 App, the UWP App may proceed by authenticating itself and sharing the protocol(s) it wants to use to opt-in to receive information from the Win32 App. The Win32 App can then leverage its App Service (which would have been shared during the registration process) to provide information. The Win32 App would not have another channel or hard-coded information about that App Service until it was registered. Then, when a second UWP App from the vendor is installed, it can also register itself. Both applications can then receive information from the Win32 App. The Win32 App is thus able to provide this information without ever having had any identifying information about the UWP Apps' App Services or required protocols prior to the Win32 App being built-in or prior to running on the system.

Secure Communication and Authentication for UWP Apps to Win32 Apps

UWP Apps may be sandboxed for file system writes, and cannot write to folders requiring Administrator-level privileges. This makes the native File System an insecure choice for performing App self-registration. For example, if the File System were used, a rogue app could potentially register its App Service with the same Protocols, or tamper with the insecure file system location to prevent the UWP App from registering with the Win32 App.

Further, Protocol Handlers and File Extension Handlers are easily hijacked. Any App can register with Windows to handle any Protocol or File Extension, i.e., Protocols and File Extensions cannot be made exclusive to one party or one software provider. Thus, there is no guarantee that a specific trusted app is launched by a UWP App invocation of a Protocol or loading of a File with a specific extension.

The systems and methods described herein ensure that the communication channel is secure, at least because: the registration is performed to the Win32 App's Process directly through Win32 IPC (e.g., via Named Pipes); and the Win32 App process validates that the registration comes from a trusted app with the ability to use the same trust mechanism (e.g., Digital Certificates) that it uses for all other component validation. These safeguards effectively guarantee to the Win32 App that all registrations of UWP Apps are performed exclusively from trusted UWP Apps-and that they can never be tampered with by rogue actors.

Performance-Optimized Discoverability

Because the Win32 App in the discoverability scenarios presented herein will not try to communicate with UWP Apps that are not installed, the Win32 App will not have to poll the system to discover which UWP Apps are installed. The Win32 App will only use the protocols declared by the UWP App. For example, a UWP App that has registered itself may pare down or increase the protocols that it uses for communication. If the list is pared down, the Win32 App does not need to send that information to the UWP App's App Service. If, instead, new protocols are added, the UWP App can register just those protocols, and the Win32 App can start communication with the new protocol. Additionally, the performance cost to perform validation only needs to be paid once by the UWP App process (i.e., when it opts-in to the Event via the registration process), rather than each time it is invoked.

Further, third parties can now produce "custom Events" through software Universal Windows Drivers. Because the techniques described herein require no third party kernel drivers for the UWP Apps or Win32 Apps, the Event registration process is more extensible and performant. To that end, the solutions presented herein may instead leverage UWP App Services for invoking the UWP Apps based on Events raised by the Win32 Apps. Unlike Universal Windows Drivers, App Services are the standard mechanism of IPC in UWP. Moreover, only Events that have been securely registered need to be propagated to the UWP Apps, adding further performance efficiencies.

UWP App Self-Registration Process

Figure 4:
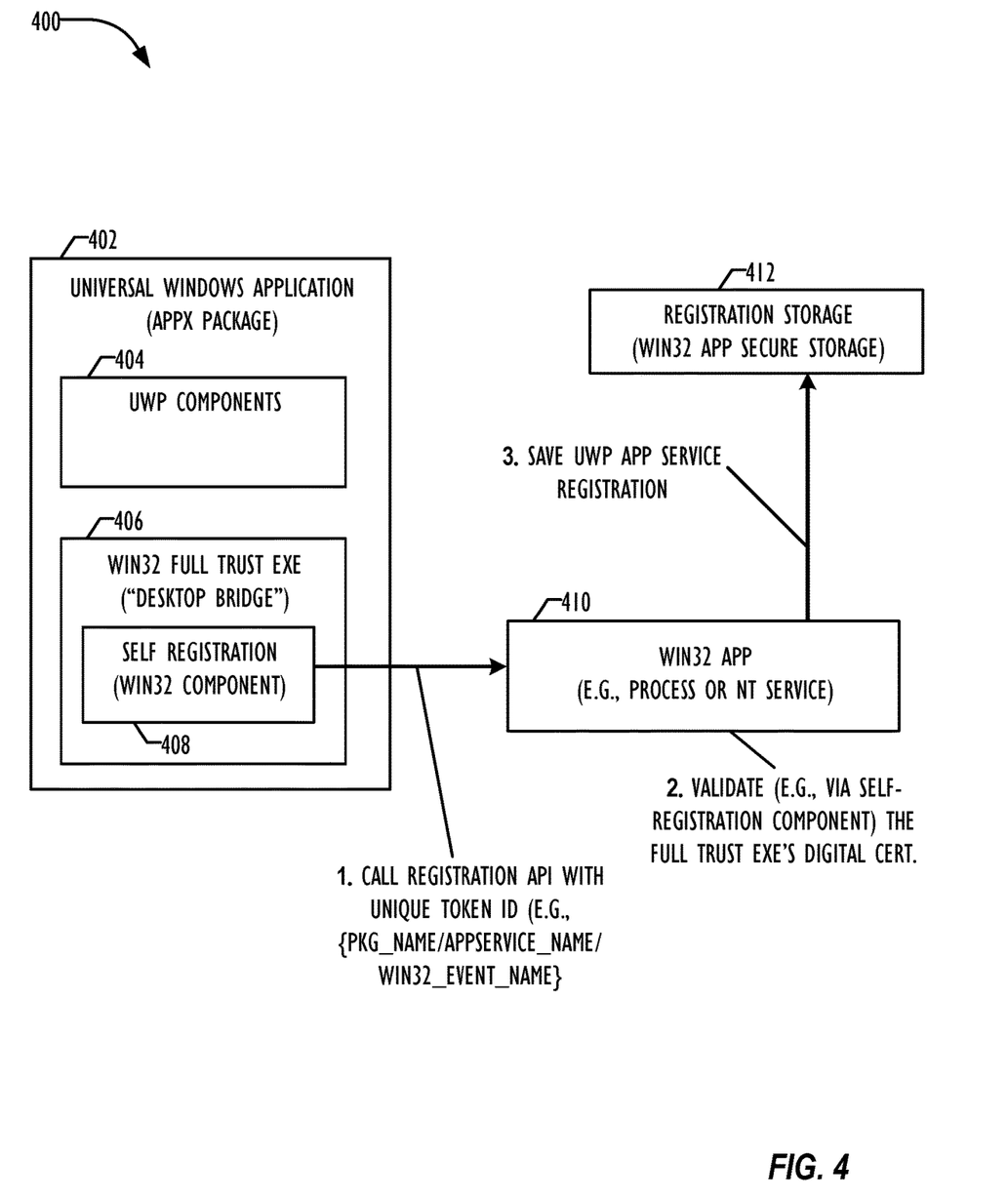
FIG. 4 is a block diagram illustrating components of an authenticated discoverability system performing a registration process, according to one or more embodiments disclosed herein.

Turning now to FIG. 4, a block diagram 400 illustrating components of an authenticated discoverability system performing a registration process is shown, according to one or more embodiments disclosed herein. According to some such embodiments, a Universal Windows Platform Application can expose an App Service that is callable from any other UWP App or Win32 App. There is no native API in Windows to discover an App Service, but there are also no restrictions on instantiating a connection from another App. According to some embodiments disclosed herein, the App Service identifier may be used as the mechanism to discover the UWP App. The UWP App is then left in control of this identifier, and it may uniquely identify the targeted UWP App's communication channel on the system (this is unlike Protocol Handlers or file associations, which can be declared to be supported non-uniquely by multiple apps).

An App Service connection allows bidirectional communication using "ValueSets" (i.e., a collection of typed objects). The use of ValueSets is open-ended, so the caller and callee may need to define a protocol to share data in an expected fashion. The Win32 App is the caller that initiates communication with the first protocol input in this case, and the UWP App is the callee. The Win32 App instantiates App Service communication according to various protocols, and the UWP App can choose which ones it supports by identifying the App Service the Win32 App should call and the Protocols the Win32 App should use. This allows any UWP App that can serve as the callee for a given protocol to get information from the Win32 App. The Win32 App will instantiate protocol connections and provide input as it is available to the Win32 App, irrespective of whether or not the UWP App is currently running. It can check for registered UWP Apps that require this information from the so-called "Registrar" component (i.e., the registration storage module 412), open the UWP App Service connections registered for this input (without checking any of the UWP Apps' metadata, such as their Digital Certificates), and pass the input over the open App Service connection, as is described in more detail with reference to FIG. 5, below.

As mentioned above, the "Desktop Bridge" program (also referred to herein as the "Full Trust EXE" or "Win32 Full Trust EXE") may be enabled for a UWP App. A UWP app may be packaged to a single .AppX file 402 containing the relevant UWP components 404, and Desktop Bridge may be used for the packaging and operation of Win32 components that are typically used for Windows Desktop Applications.

Registry and File System API access is available and sandboxed, but interprocess communication (IPC)-related APIs, such as Named Pipes, are available.

According to some embodiments described herein, the Win32 "Full Trust EXE" 406 is packed with the .AppX file 402. Code in this Full Trust EXE (whether loaded in a DLL, linked in a Library, or in the main EXE) can be used to access a running process, such as an NT Service 410, to perform a self-registration process, e.g., using self-registration component 408. As mentioned, the Win32 App Process could be an NT Service, but it could also be a standard User Session Process, or an Admin-elevated Process. In fact, if secure IPC is possible from the Full Trust EXE, any Win32 Process is a candidate. In such embodiments, the NT Service (or other process) may belong to a Win32 App separate from the UWP App. The NT Service (or other process) may thus check that its caller, i.e., the Full Trust EXE (and not the UWP AppX Package), is signed by an approved Digital Certificate.

According to some processes for performing self registration within an authenticated discovery system as described herein, the Full Trust EXE 406 may begin a discovery process by declaring its supported App Services and protocols to a running NT Service 410, e.g., by calling a registration method of a Registration API of the self registration component 408 (see step 1. In FIG. 4). In some embodiments, the registration method may be passed a digital signature for each App Service and Event that the Full Trust EXE registers. In some embodiments, the digital signature may comprise one or more elements that, taken together, provide a unique identifier "token," by which a given App Service and Event type may be identified. As a further example, in some embodiments, the token identifier may comprise one or more of the following elements: a UWP App Package Family name, a UWP App Service name, and/or the Win32 Event names. In some such embodiments, the elements comprising the token identifier may be concatenated together, optionally using a delimiter, such as a '.' or '/'. The UWP may then be authenticated by the NT Service 410 via self-registration component 408, e.g., using the Full Trust EXE's Digital Certificate for validation (see step 2. in FIG. 4). Finally, the NT Service may choose to opt-in the "authenticated" UWP Apps for communication from the Win32 App, e.g., via saving the UWP app's App Service identifier and declared protocol (and/or Event), e.g., in the form of the aforementioned token identifier, to the Win32 Registrar service (which data may be kept in a secure storage area accessible to the Win32 App), to allow for subsequent trusted communications between the Win32 App and the UWP App Service via the declared protocol (see step 3. in FIG. 4).

Figure 5:
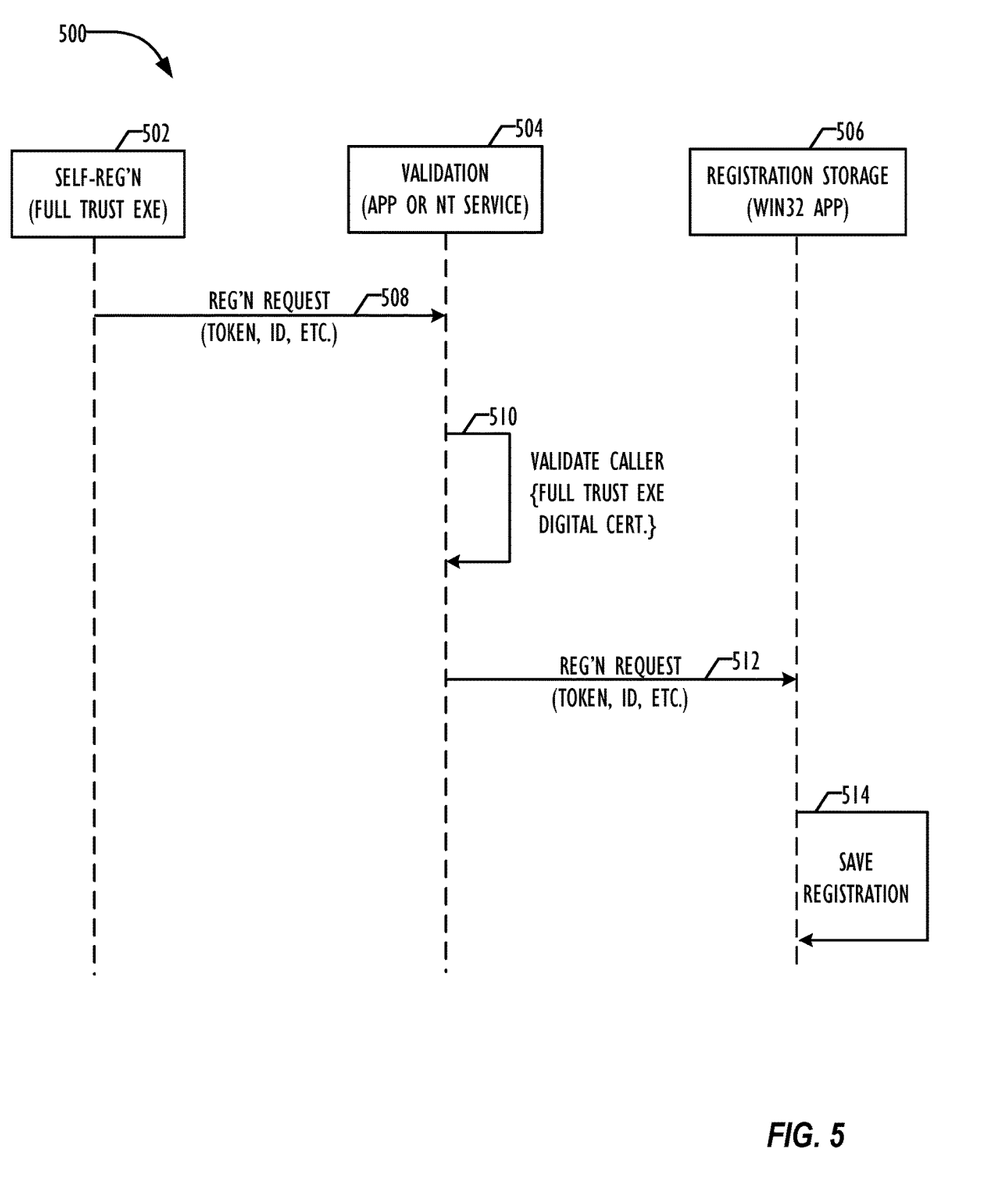
FIG. 5 is a flow diagram illustrating an authenticated registration flow, according to one or more embodiments disclosed herein.

Turning now to FIG. 5, a flow diagram 500 illustrating an authenticated registration flow is shown, according to one or more embodiments disclosed herein. When the UWP App is run, e.g., via Full Trust EXE 502, it may request self-registration to the Win32 App or NT Service 504 using its token (or other form of identifier) that otherwise uniquely identifies the relevant App Service name and the Win32 App's protocol (and/or Event) that the UWP App would like to take as input from the Win32 App (Step 508). After the Win32 App or NT service 504 validates the UWP App's Full Trust EXE, e.g., using the Full Trust EXE's Digital Certificate (Step 510), the App or NT Service 504 may make a registration request with the registration storage component 506 of the Win32 App (Step 512). Finally, the registration may be persisted in the registration storage component 506 (Step 514). The Win32 App that maintains the registration storage component 506 may, in this way, be guaranteed that the registered App Services come only from trusted UWP Apps. As may now be understood, this is different from the typical trust paradigm of checking a digital signature each time data is to be passed between applications.

Application Service Discovery Process

Figure 6:
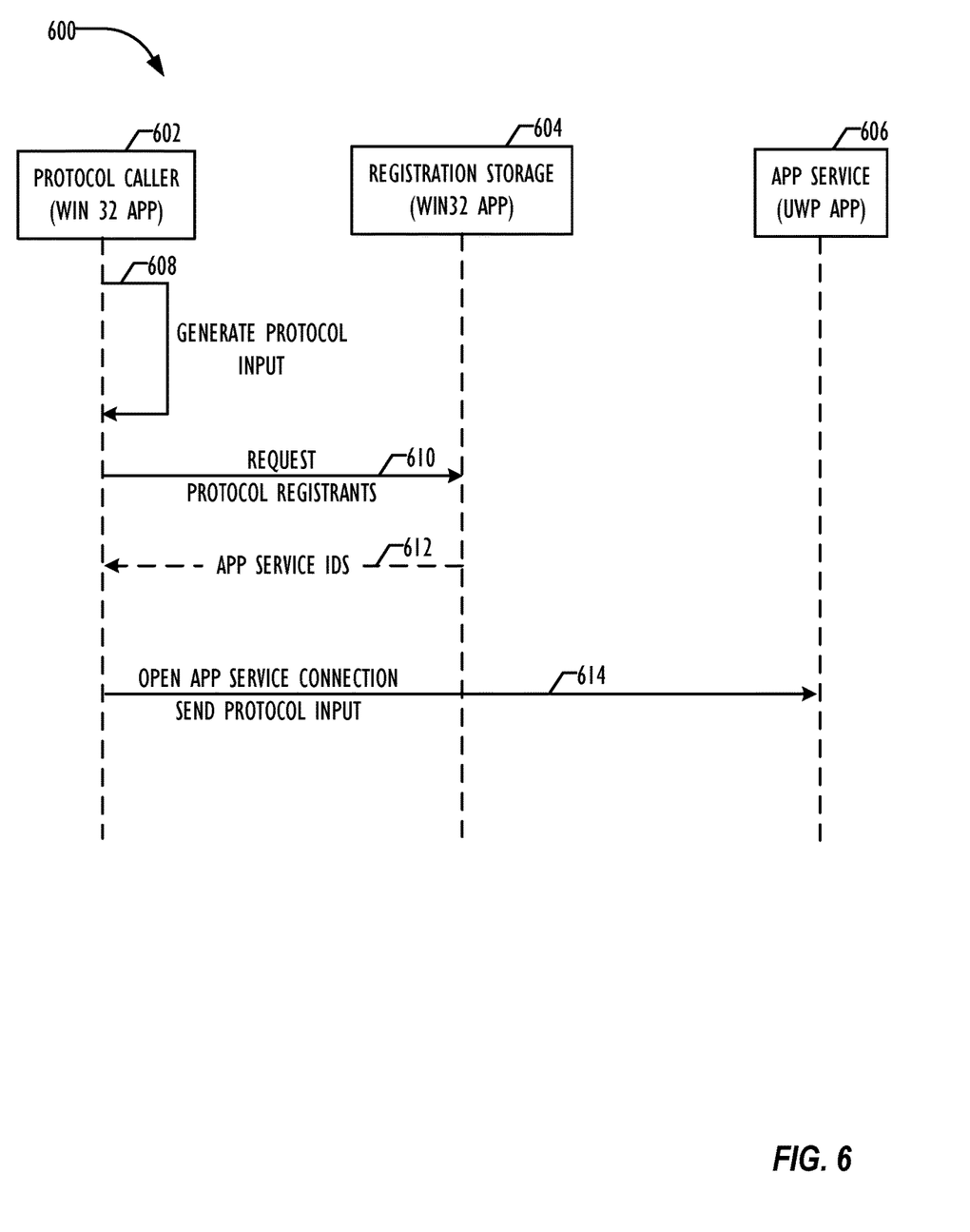
FIG. 6 is a flow diagram illustrating an application service discovery flow, according to one or more embodiments disclosed herein.

Turning now to FIG. 6, a flow diagram 600 illustrating an application service discovery flow is shown, according to one or more embodiments disclosed herein. According to some such embodiments, the Protocol Caller 602 (e.g., in the form of a Win32 App) can know which UWP Apps it should communicate with by checking with the registration storage component 604 for registered App Services and protocols 606 that have been registered by UWP Apps. First, the Protocol Caller 602 may generate protocol input for the protocols that it is interested in communicating over (Step 608). A protocol comprises a well-defined format for caller and callee to communicate. According to some embodiments, the Win32 caller may decide when to start the communication "handshake" with the UWP App. In other words, in such embodiments, the UWP callee application does not have to presently be open and running on the system in order to receive Events or information from Win32 Apps that it has registered an interest in. Next, the protocol input may be sent to the registration storage component 604 of the Win32 App, e.g., in the form of a request for protocol registrants implementing the protocols of interest (Step 610). The registration storage component 604 may then return the App Service IDs of registered applications (Step 612). Finally, the Protocol Caller 602 (e.g., the Win32 App) may open an App Service connection to the registered App Services supporting a compatible protocol and send the generated protocol input (Step 614).

In this way, no App Service connections need to be opened solely to check for a UWP application's availability. As may now be understood, the UWP App is not the application requesting the Win32 App to send it data. Instead, once the UWP app has been registered with the Registrar, this request is considered to have been made implicitly. The Win32 App may then check with the Registrar for available App Services, meaning that the start of the protocol communication may come from the Win32 App. Thus, the Win32 App, in its role as the caller application, knows what input is required for each Protocol. Then, when the information or Event that a UWP app has registered an interest in becomes available, the Win32 App can pass such information or Event on to the UWP app via the registered App Service and protocol.

Secure Event Broadcasting Process

Figure 7:
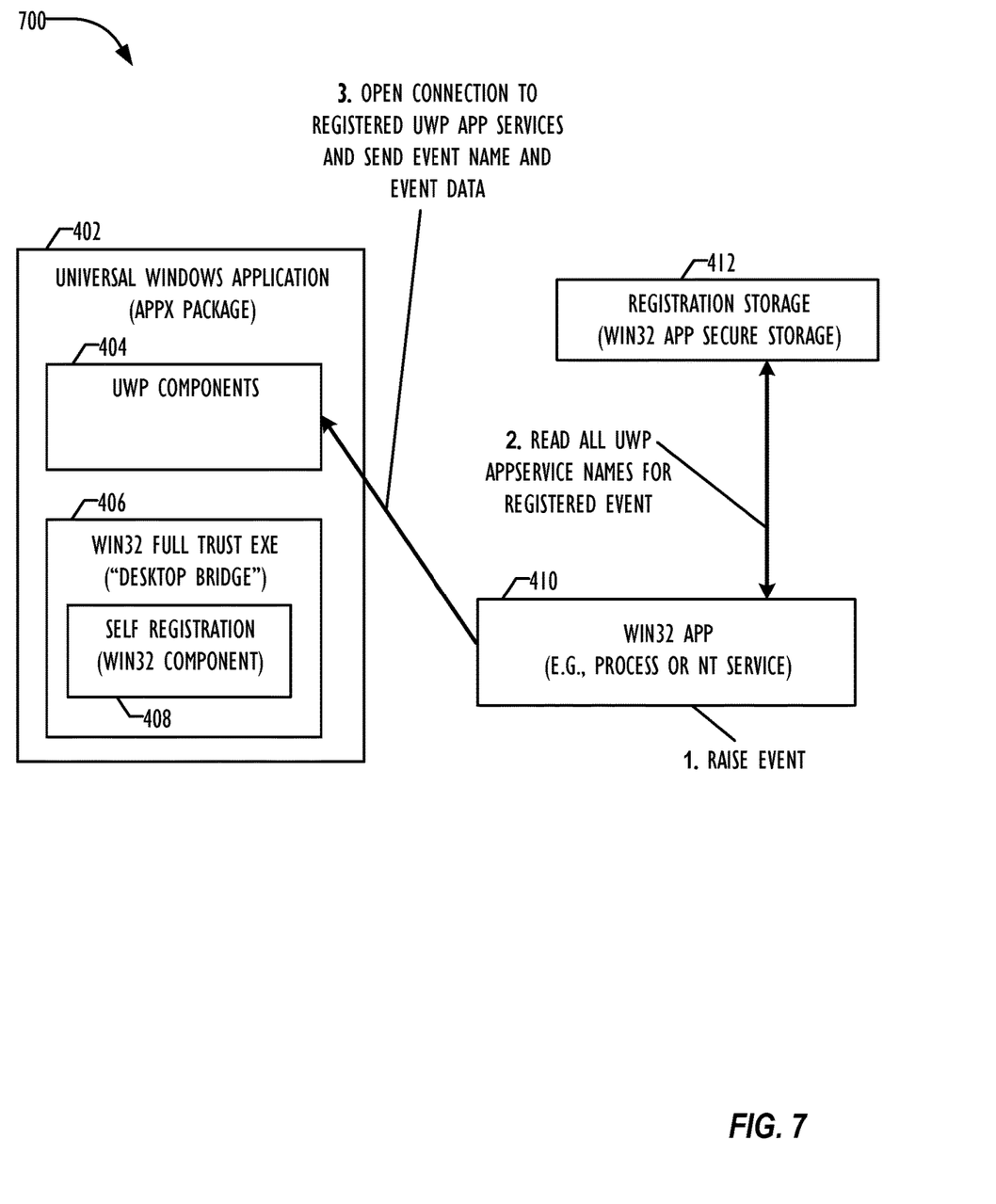
FIG. 7 is a block diagram illustrating components of an authenticated discoverability system performing an Event broadcasting process, according to one or more embodiments disclosed herein.

Turning now to FIG. 7, a block diagram 700 illustrating components of an authenticated discoverability system performing an Event broadcasting process is shown, according to one or more embodiments disclosed herein. The components of block diagram 700 in FIG. 7 are the same as those described above with respect to block diagram 400 of FIG. 4. However, FIG. 7 illustrates the discoverability system performing a different process, in particular, the sending of Event information by a Win32 App to registered UWP App Services.

According to some processes for performing Event broadcasting within an authenticated discovery system as described herein, the Win32 App 410 may begin the Event broadcast process by raising whatever Event(s) it may have cause to raise in general operation (see step 1. in FIG. 7). The registration store 412 may then return the names of all of the App Services that have registered an interest in the particular type of Event that is being raised (see step 2. in FIG. 7). Finally, the Win32 App may open a connection(s) to the relevant registered UWP App Services (Windows 10 will, at this time, automatically launch the associated UWP Apps), and send the particular Event's name and data to the registered UWP App Services (see step 3. in FIG. 7). For example, an illustrative Event name may be "BLOCKED_PORT," and the Event data associated with such Event may be a more specific string, such as "Ports 85, 95, and 99 have been blocked." The callee UWP app may take that information and consume/utilize it as desired, e.g., displaying a pop-up message or updating a Live Tile with information regarding the numbers of the ports on the machine that have been blocked. When completed, the Win32 App may close the App Service connections. As may now be more fully appreciated, there is no additional authentication per-Event necessary, beyond what is required internally by the Win32 App to access to the registration store. As such, the UWP App is only authenticated at time of registration, thus resulting in a more performant solution.

Exemplary Authenticated Discoverability System and Method

Figure 8:
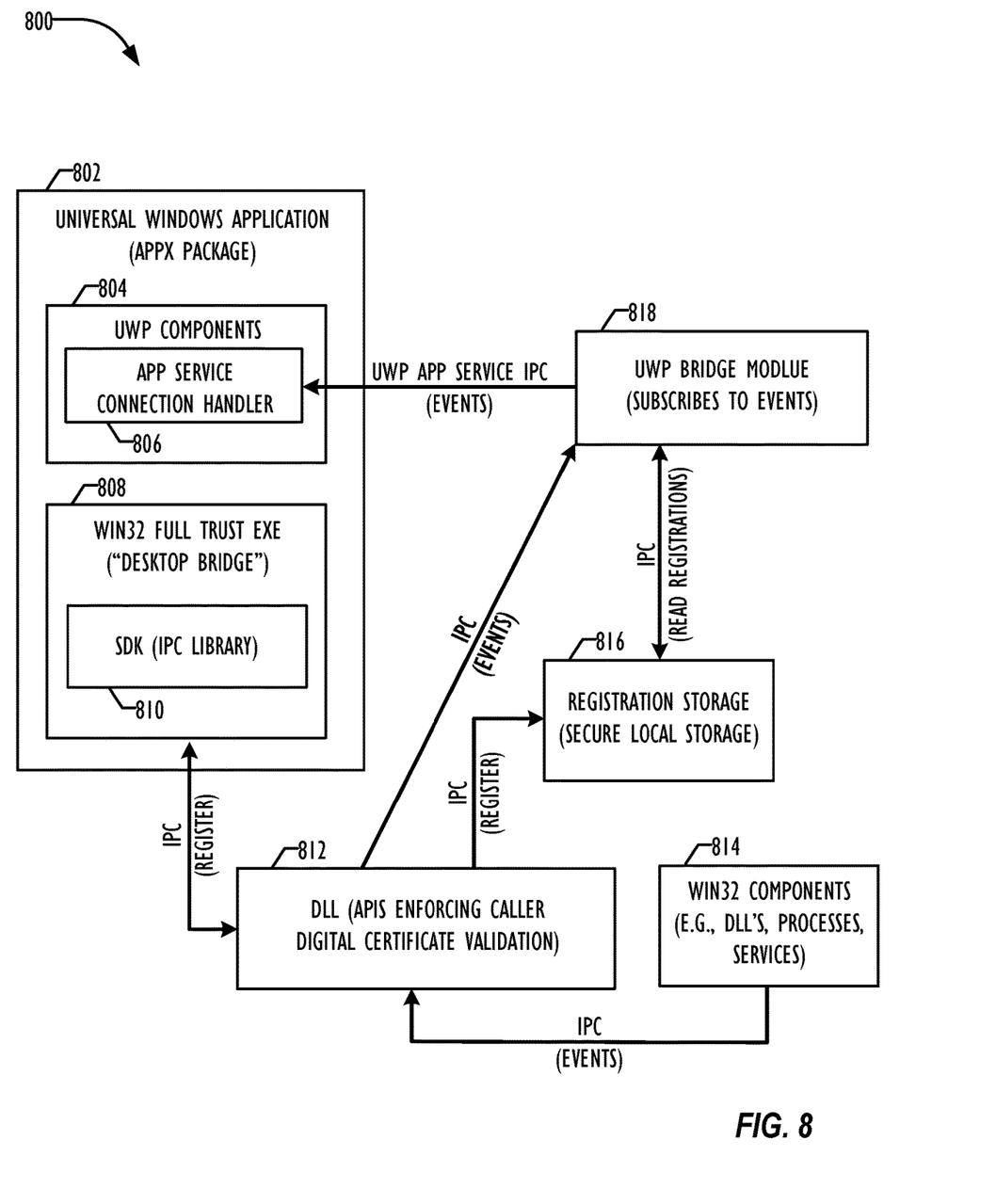
FIG. 8 is a block diagram illustrating components of an authenticated discoverability system, according to one or more embodiments disclosed herein.

Turning now to FIG. 8, a block diagram illustrating components of an authenticated discoverability system 800 is shown, according to one or more embodiments disclosed herein. System 800 comprises a UWP app (802), a Win32 App having various components (814), such as DLLs, processes, services, etc., and an interprocess communication channel supporting caller validation (such as Named Pipes) between the UWP App (802) and the Win32 App (814). The UWP app (802) may comprise various UWP components (804) to implement the functionality of the UWP app, and may further include custom WinRT code serving as an App Service Connection handler (806), e.g., code to handle the App Service connections to Win32 Apps (e.g., Win32 App 814). The UWP app (802) may further comprise a Win32 Full Trust EXE (808) (also referred to herein as a "Desktop Bridge" application) and, optionally, an SDK (810), e.g., comprising an IPC library allowing the UWP App to more easily handle the data that is put in to the App Service.

System 800 also comprises various other modules for facilitating the authenticated discovery processes described herein, e.g., a registration storage module (816) (which may, e.g., be implemented as an SQLCipher-encoded local DB file or other form of secure local storage) and a UWP Bridge Module (818) for facilitating the transmission of Events from the Win32 App to the UWP app via IPC, such as via App Services.

The UWP app's (802) Full Trust EXE (808) stores the UWP App's App Service identifier and requested message names in the registration storage (816), e.g., using one or more DLLs (812) having APIs that may be utilized to validate the Digital Certificate of the calling UWP App (802). As mentioned, IPC between the UWP App's Full Trust EXE (808) and the other various system components may be achieved through the use of protected Named Pipes, for which trust has been established by checking the Digital Certificate of the caller.

The UWP Bridge Module (818) may subscribe to the Events that have been requested by registered UWP Apps on their behalf, e.g., based on the data stored in registration storage (816). Then, when the relevant Events are raised by the Win32 App (814), the UWP Bridge Module (818) may discover the required App Services from registration storage (816), instantiate the necessary App Service connections to the interested UWP Apps (802), and, finally, pass through the messages relating to the relevant raised Events in a desired format, e.g., as ValueSets. UWP Bridge Module (818) may also perform whatever translation is necessary to transform the Events originating from the Win32 App into, e.g., typed ValueSet objects used by App Services. As mentioned above, the Events and related messages may be proxied over the UWP App Service in ValueSets, and the Event data may use the same payload that is used by the Win32 App (e.g., a JSON payload).

EXAMPLES

The following examples pertain to further embodiments.

Example 1 is a computer system, comprising a memory; and one or more processors communicatively coupled to the memory wherein, the memory comprises instructions stored therein to cause the one or more processors to perform a computer implemented method, the method comprising: executing a first executable application designed for execution on a first platform; receiving, by the first executable application, a first registration request from a second executable application designed for execution on a second platform, wherein the second executable application comprises: a first one or more components specific to the second platform; and a second component that has a digital certification; validating, by the first executable application, the digital certification of the second component; and in response to validating the digital certification of the second component, saving, by the first executable application, information from the first registration request into a registration store, wherein the information saved from the first registration request includes a unique identifier comprising: an identification of one or more types of events that the second executable application is interested in receiving information about from the first executable application; raising, by the first executable application, one or more events, each event having an event type and event information; and sending, to the second executable application, only the raised events having an event type that the second executable application has registered an interest in receiving information about.

Example 2 comprises the subject matter of Example 1, wherein the first platform comprises the Windows Desktop Platform (i.e., Win32).

Example 3 comprises the subject matter of Example 2, wherein the second platform comprises the Universal Windows Platform (i.e., UWP).

Example 4 comprises the subject matter of Example 1, wherein the second component comprises: a Full Trust executable or Desktop Bridge executable.

Example 5 comprises the subject matter of Example 1, wherein the act of validating further comprises performing digital signature verification.

Example 6 comprises the subject matter of Example 1, wherein the registration store comprises an encrypted data store in the memory.

Example 7 comprises the subject matter of Example 1, wherein the unique identifier further comprises: an App Service name for the second executable application.

Example 8 comprises the subject matter of Example 7, wherein the unique identifier further comprises: a package family name for the second executable application.

Example 9 comprises the subject matter of Example 1, and further comprises: determining, for each raised event, each executable application for which information has been stored in the registration store indicating an interest by the respective executable application in receiving information about the respective raised event's type.

Example 10 comprises the subject matter of Example 9, and further comprises: sending each raised event to the executable applications that have been determined to have an interest in receiving information about the respective raised event's type.

Example 11 comprises the subject matter of Example 1, wherein the act of sending further comprises, for each event that is sent: opening an App Service; and sending the respective raised event to the opened App Service.

Example 12 is a computer-implemented method, comprising: executing a first executable application designed for execution on a first platform; receiving, by the first executable application, a first registration request from a second executable application designed for execution on a second platform, wherein the second executable application comprises: a first one or more components specific to the second platform; and a second component that has a digital certification; validating, by the first executable application, the digital certification of the second component; and in response to validating the digital certification of the second component, saving, by the first executable application, information from the first registration request into a registration store, wherein the information saved from the first registration request includes a unique identifier comprising: an identification of one or more types of events that the second executable application is interested in receiving information about from the first executable application; raising, by the first executable application, one or more events, each event having an event type and event information; and sending, to the second executable application, only the raised events having an event type that the second executable application has registered an interest in receiving information about.

Example 13 comprises the subject matter of Example 12, wherein the second component comprises: a Full Trust executable or Desktop Bridge executable.

Example 14 comprises the subject matter of Example 12, wherein the unique identifier further comprises: an App Service name for the second executable application.

Example 15 comprises the subject matter of Example 13, wherein the unique identifier further comprises: a package family name for the second executable application.

Example 16 is a non-transitory computer readable medium storing a program, comprising computer executable instructions stored thereon to cause one or more processing units to: execute a first executable application designed for execution on a first platform; receive, by the first executable application, a first registration request from a second executable application designed for execution on a second platform, wherein the second executable application comprises: a first one or more components specific to the second platform; and a second component that has a digital certification; validate, by the first executable application, the digital certification of the second component; and in response to validating the digital certification of the second component, save, by the first executable application, information from the first registration request into a registration store, wherein the information saved from the first registration request includes a unique identifier comprising: an identification of one or more types of events that the second executable application is interested in receiving information about from the first executable application; raise, by the first executable application, one or more events, each event having an event type and event information; and send, to the second executable application, only the raised events having an event type that the second executable application has registered an interest in receiving information about.

Example 17 comprises the subject matter of Example 16, wherein the first platform comprises the Windows Desktop Platform.

Example 18 comprises the subject matter of Example 17, wherein the second platform comprises the Universal Windows Platform.

Example 19 comprises the subject matter of Example 16, wherein the second component comprises: a Full Trust executable or Desktop Bridge executable.

Example 20 comprises the subject matter of Example 16, wherein the instructions to validate further comprises instructions to: perform digital signature verification.

Embodiments, such as those described above, may be implemented in one or a combination of hardware, firmware, and software. Embodiments may also be implemented as instructions stored on a computer-readable storage medium, which may be read and executed by at least one processing element to perform the operations described herein. A computer-readable storage medium may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

Embodiments, as described herein, may include, or may operate on, logic or a number of components, modules, or mechanisms. Modules may be hardware, software, or firmware communicatively coupled to one or more processing elements in order to carry out the operations described herein. Modules may be hardware modules, and as such, modules may be considered tangible entities capable of performing specified operations and may be configured or arranged in a certain manner. Circuits may be arranged (e.g., internally or with respect to external entities such as other circuits) in a specified manner as a module. The whole or part of one or more programmable devices (e.g., a stand-alone client or server computer system) or one or more hardware processing elements may be configured by firmware or software (e.g., instructions, an application portion, or an application) as a module that operates to perform specified operations. The software may reside on a computer readable medium. The software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Where modules are temporarily configured, each of the modules need not be instantiated at any one moment in time. For example, where the modules comprise a general-purpose hardware processing element configured using software; the general-purpose hardware processing element may be configured as respective different modules at different times. Software may accordingly program a hardware processor, for example, to constitute a particular module at one instance of time and to constitute a different module at a different instance of time. Modules may also be software or firmware modules, which operate to perform the methodologies described herein.

What is claimed is:

1. A computer system, comprising:
   one or more processors; and
   a memory including instructions that, when executed, cause the one or more processors to at least:
      execute a first executable application designed for execution using a first application programming interface (API);

access a first registration request from a second executable application designed for execution using a second API different from the first API, the first API and the second API executed within a same operating system environment, wherein the second executable application includes:
 one or more components specific to the second API; and
 one or more components that have a digital certification;
validate the digital certification of the one or more components; and
in response to the validating of the digital certification of the one or more components, save information from the first registration request into a registration store, wherein the information saved from the first registration request includes a unique identifier including (1) an identification of one or more types of events that the second executable application is to receive from the first executable application, and (2) a package family name for the second executable application;
raise, by the first executable application, an event having an event type and event information; and
send, to the second executable application, in response to determining that the event type of the raised event is saved in the registration store, the raised event without requiring further authentication from the second executable application.

2. The computer system of claim 1, wherein the first API is implemented using a desktop platform.

3. The computer system of claim 2, wherein the second API is implemented using a universal platform.

4. The computer system of claim 1, wherein the one or more components specific to the second API include a Full Trust executable Desktop Bridge program.

5. The computer system of claim 1, wherein the one or more processors are to validate the digital certification by performing digital signature verification.

6. The computer system of claim 1, wherein the registration store includes an encrypted data store.

7. The computer system of claim 1, wherein the unique identifier further includes an App Service name for the second executable application.

8. The computer system of claim 1, wherein the one or more processors are further to determine, for each raised event, each executable application for which information has been stored in the registration store indicating an interest by the respective executable application in receiving information about the respective raised type of the event.

9. The computer system of claim 8, wherein the processor is to send the event to a third executable application that has requested events matching the event type of the raised event.

10. The computer system of claim 1, wherein, to send the event, the one or more processors are to
 open an App Service; and
 send the raised event to the opened App Service.

11. A method, comprising:
executing a first executable application structured to be executed using a first application programming interface (API);
accessing a first registration request from a second executable application structured to be executed using a second API different from the first API, the first API and the second API executed within a same operating system environment, wherein the second executable application includes:
 one or more components specific to the second API; and
 one or more components that have a digital certification;
validating the digital certification of the one or more components; and
in response to the validating of the digital certification of the one or more components, saving information from the first registration request into a registration store, wherein the information saved from the first registration request includes a unique identifier including (1) an identification of one or more types of events that the second executable application is to receive from the first executable application, and (2) a package family name for the second executable application;
raising, by the first executable application, an event having an event type and event information; and
sending, to the second executable application, in response to determining that the event type of the raised event is saved in the registration store, the raised event without requiring further authentication from the second executable application.

12. The method of claim 11, wherein the second component includes at least one of a Full Trust executable or a Desktop Bridge executable.

13. The method of claim 11, wherein the unique identifier further includes an App Service name for the second executable application.

14. A computer readable storage disk or storage device that are not a propagating signal, comprising computer executable instructions that, when executed, to cause one or more processors to at least:
execute a first executable application designed for execution using a first application programming interface (API);
access a first registration request from a second executable application designed for execution using a second API different from the first API, the first API and the second API executed within a same operating system environment, wherein the second executable application includes:
 a first one or more components specific to the second API; and
 a second component that has a digital certification;
validate the digital certification of the second component; and
in response to the validating of the digital certification of the second component, save-information from the first registration request into a registration store, wherein the information saved from the first registration request includes a unique identifier including (1) an identification of one or more types of events that the second executable application is to receive from the first executable application, and (2) a package family name for the second executable application;
raise, by the first executable application, an event having an event type and event information; and
send, to the second executable application, in response to determining that the event type of the raised event is saved in the registration store, the raised event without requiring further authentication from the second executable application.

15. The computer readable storage disk or storage device of claim 14, wherein the first API is implemented using a desktop platform.

16. The computer readable storage disk or storage device of claim 15, wherein the second API is implemented using a universal platform.

17. The computer readable storage disk or storage device of claim 14, wherein the second component includes a Full Trust executable, also referred to as a Desktop Bridge program.

18. The computer readable storage disk or storage device of claim 14, wherein the instructions further cause the one or more processors to perform digital signature verification.

* * * * *

UNITED STATES PATENT AND TRADEMARK OFFICE
CERTIFICATE OF CORRECTION

PATENT NO. : 10,657,246 B2
APPLICATION NO. : 15/938984
DATED : May 19, 2020
INVENTOR(S) : Biswas et al.

Page 1 of 1

It is certified that error appears in the above-identified patent and that said Letters Patent is hereby corrected as shown below:

In the Claims
Column 16, Line 30, Claim 14:
After "device that" replace "are" with --is--.
Column 16, Line 31, Claim 14:
After "when executed," delete "to".

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*